July 16, 1968

C. E. COVINGTON ET AL 3,392,788

ROTOR BLADE

Original Filed Dec. 3, 1965

INVENTORS
CECIL E. COVINGTON
WESLEY L. CRESAP
JAN M. DREES
BY
ATTORNEY

United States Patent Office 3,392,788
Patented July 16, 1968

3,392,788
ROTOR BLADE
Cecil E. Covington, Hurst, Wesley L. Cresap, Fort Worth, and Jan M. Drees, Dallas, Tex., assignors to Bell Aerospace Corporation, Wheatfield, N.Y.
Original application Dec. 3, 1965, Ser. No. 511,389, now Patent No. 3,316,976, dated May 2, 1967. Divided and this application Mar. 10, 1967, Ser. No. 645,076
1 Claim. (Cl. 170—159)

This application is a divisional application of application Ser. No. 511,389, filed Dec. 3, 1965, now Patent No. 3,316,976.

This invention relates to rotary wing aircraft and, in particular, to rotor blades for rotary wing aircraft.

The maximum operating speed of rotary wing aircraft is often determined by rotor induced vibrations and/or structural limitations of the control system. With increasing speed, the oscillating forces produced by the rotor, which are resisted in the control system, increase so rapidly that before the true maximum speed of which the aircraft may be capable is attained, the rotor forces are at their upper permissible limit or the aircraft vibrations are excessive. As a consequence, the instrument panels of helicopters are usually placarded for a maximum operational speed that is less than the aircraft's true maximum speed. By placarding is meant that notices are placed on the speed-indicating instrument warning the pilot that the craft must not be operated above a certain speed.

It is an object of this invention to provide a blade construction that permits an increase in the operational speed of rotary wing aircraft.

It is an object of this invention to reduce oscillating rotor forces and, correspondingly, to reduce loads in the rotor control system.

Another object of this invention is to provide a more efficient rotor.

Another object is to permit higher operating rotational speed of the rotor.

Another object is to enable utilization in forward flight of all or most of the power available in rotary wing aircraft.

Another object is to decrease vibrations in rotary wing aircraft and enhance passenger comfort.

Still another object is to provide a method of constructing a tapered rotor blade.

Objectionable rotor forces at the higher speeds derive in part from the compressibility effect at the tip of the advancing blade as its speed (rotational plus translational) approaches a mach number of 1.0, the speed of sound. The compressibility effects result in increased drag as well as high negative pitching moments (forces tending to decrease blade pitch) that must be resisted by the rotor control system. To delay onset of compressibility effects and thereby eliminate this drag rise and the negative pitching moments, this invention contemplates providing a rotor blade with an integral, tapered outboard section that has a progressively thinner airfoil section (ratio of thickness to chord length) towards the blade tip, where the air speed over the rotor is at a maximum.

The increased speed capability provided by the outboard, integral, tapered blade section introduces another factor tending to preclude its attainment which is involved with the increased disymmetry of the air flow over the rotor at higher speeds. By disymmetry of air flow over the rotor is meant the difference in the relative velocity of the air as it moves over the advancing and retreating blades which results from the fact that the relative air flow over the advancing blade is the sum of the blades rotational and translational speeds, while that over the retreating blade is the difference between its rotational and translational speeds. With increased speed the relative air flow over the inboard section of the retreating blade becomes increasingly "reverse," flowing more rapidly than before in the direction from trailing edge to leading edge. This is easily understood when it is appreciated that the rotational speed of the inboard section, being close to the center of rotation at which point the rotational speed is zero, is quite low. It will also be appreciated that with higher translational speed the area of reverse flow will extend further outboard along the retreating blade.

The flow reversal causes a downward load and a positive pitching moment on the retreating blade. Normally, of course, the lift on a section of a blade acts upwardly, effectively acting at the center of pressure which is approximately at a point 25% of the chord length from the leading edge. The blade pitch change axis is ordinarily placed along the blade's 25% chord line so that the aerodynamic force created by the blade does not act to push the blade around the pitch change axis. However, in the area of reverse flow, the aerodynamic force on the blade acts downwardly and its center of pressure moves rearwardly to about 75% of the chord from the leading edge, thus lessening the effective lifting force of the rotor and exerting a force that tends to turn the blade around the pitch change axis so as to increase blade pitch, which is called a positive pitching moment. As is the case of the negative pitching moment on the advancing blade, this positive pitching moment must be resisted by the rotor control system.

The invention provides a blade structure that reduces the down load and the positive pitching moment of the retreating blade's inboard section, and also reduces the negative pitching moment of the advancing blade's outboard section. Thus, in general, the invention contemplates a rotor blade constructed with inboard and outboard sections that effectively combine to permit satisfactory rotor performance at higher vehicular speeds.

Prior rotor constructions have suggested the use of a tapered tip portion connected to the basic rotor blade. However, with such a construction, high oscillatory loads must be carried through the attachment between the tapered section and the basic blade and the attachment is an inherent source of stress concentration factors. The integral construction herein taught results in a blade with good structural integrity and without the weight increase or aerodynamically poor surfaces that may result from the attachments.

Also, entire blades have been tapered progressively from a root end section to the outboard tip, and although this offers advantages relating to the matter under consideration, it also presents distinct disadvantages. For example, if it is desired to provide such a tapered blade with a certain tip thickness and a certain root end thickness, then the thickness at the ¾ span section (the approximate effective spanwise location of the center of pressure of the blade) will be excessively thin for most efficient rotor operation. On the other hand, if it is desired to maintain a certain tip thickness and a certain ¾ span thickness, then the root thickness will be excessive, with penalties in weight and drag.

The manner in which the present invention improves upon existing rotor constructions will be apparent from the following description of the embodiment illustrated in the accompanying drawings in which.

Figure 1:
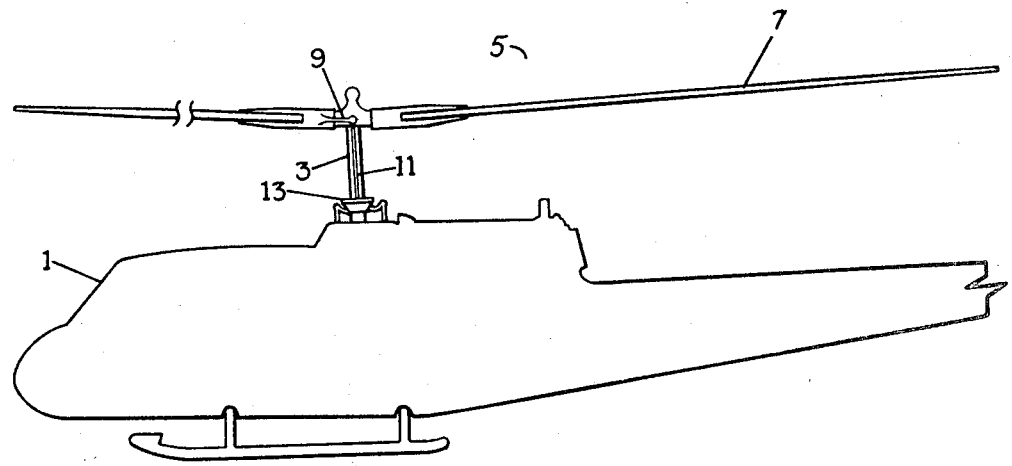
FIG. 1 is a side view of a helicopter employing an embodiment of the invention.
Figure 1A:
FIGURE 1a is a side view of the tip of the rotor blade of FIGURE 1.
Figure 2:
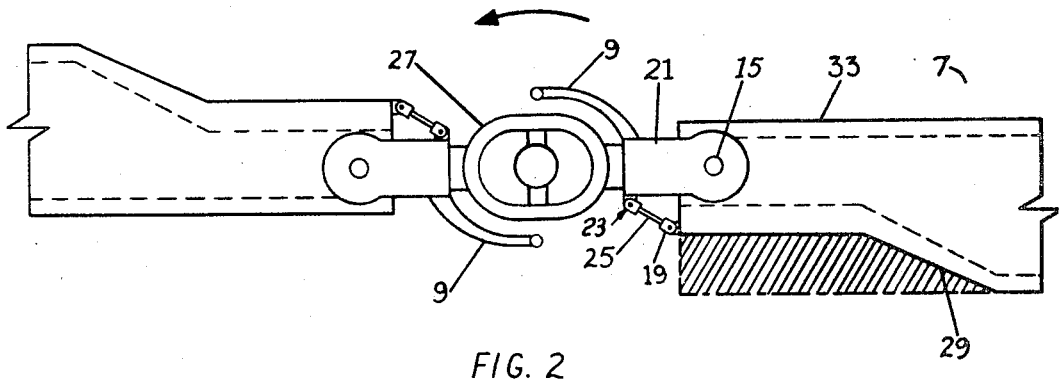
FIG. 2 is a plan view of the inboard section of the helicopter rotor of FIG. 1.

Referring to FIG. 1 and 2, the helicopter fuselage 1, containing an engine (not shown) supports the mast 3, driven by the engine. The rotor 5 is supported at the top of the mast and comprises blades attached to blade grips 21 at axis 15 (see FIG. 2), the blade grip 21 being rotatively hinged to yoke 27 so as to rotate around an axis positioned in a direction essentially parallel to the longitudinal axes of the blade for pitch change. The blade 7 is also attached at 19 to one end of the drag brace 25 which attaches at its other end at 23 to blade grip 21 and thus prevents the blade from rotating around axis 15. A pitch horn 9 extends from blade grip 21 and is attached to pitch link 11 which extends down to swashplate 13 (FIG. 1). Movement of the swashplate by the pilot actuates pitch link 11, rotating the blade for a pitch change and thus providing control of the craft.

Considering the pitch link 11, it should be clear that when this link resists a tendency of the blade to increase pitch, the link, shown as attached to the forward or leading edge of the blade, will have a load in tension; and when such a link resists a tendency of the blade to decrease pitch it will have a load in compression.

The outer portion of blade 7 is tapered so as to provide a narrow section (in thickness) towards the tip and the blade is also constructed so that, at the inboard section, a portion, toward the trailing edge of the blade (away from the direction of rotation) has been cut away.

Figure 3:
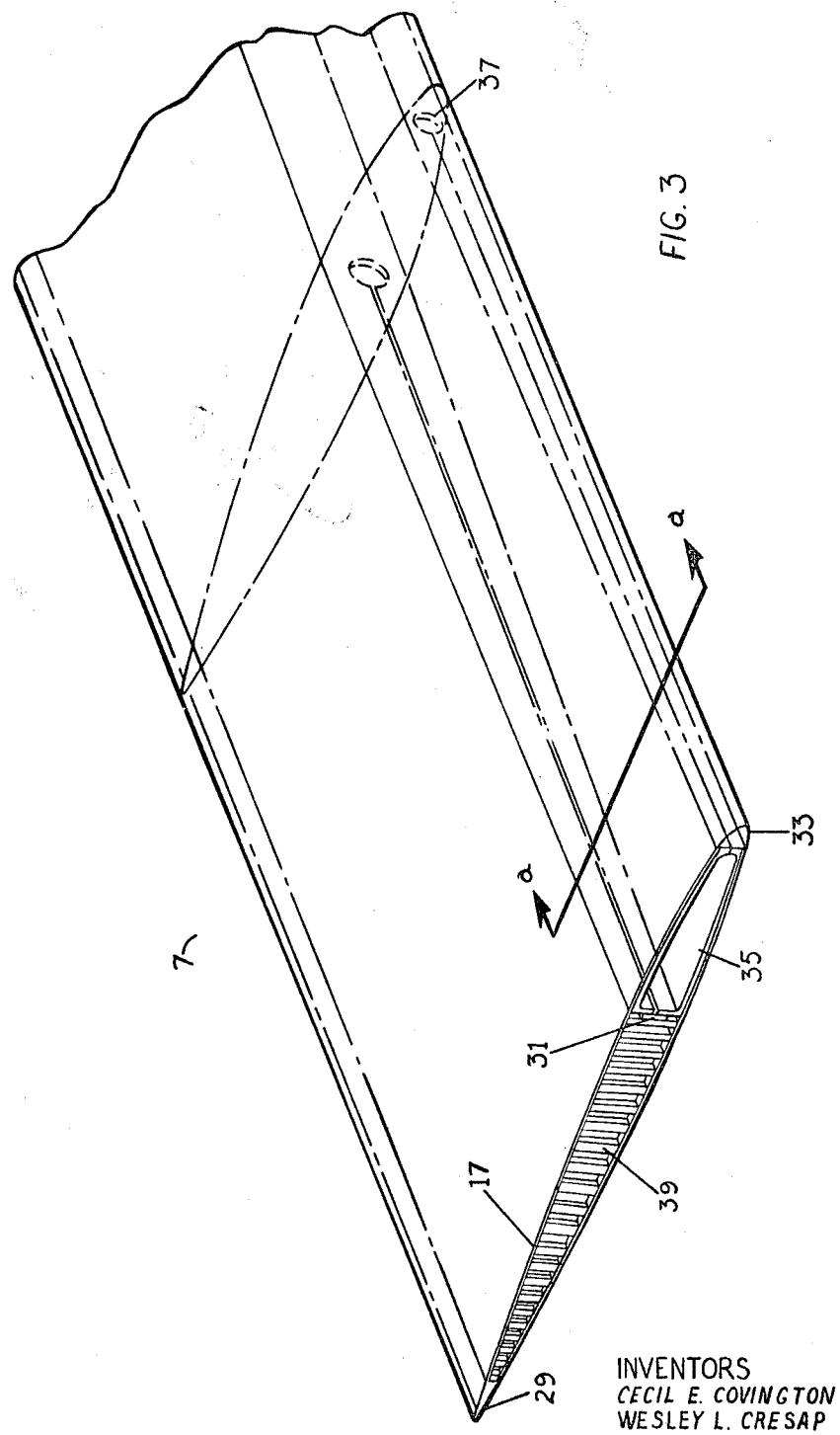
FIG. 3 is a view in perspective of the outboard section of the rotor blade of FIG. 1.
Figure 5:
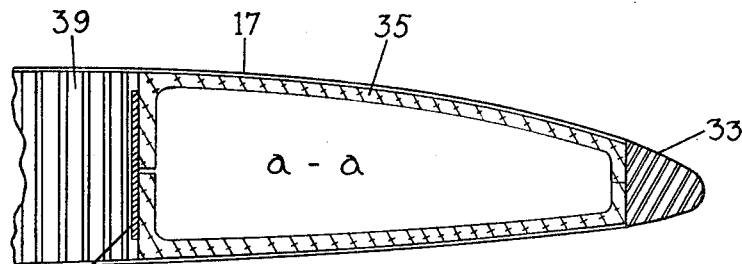
FIG. 5 is a partial section taken through section a—a of FIG. 3.
Figure 6:
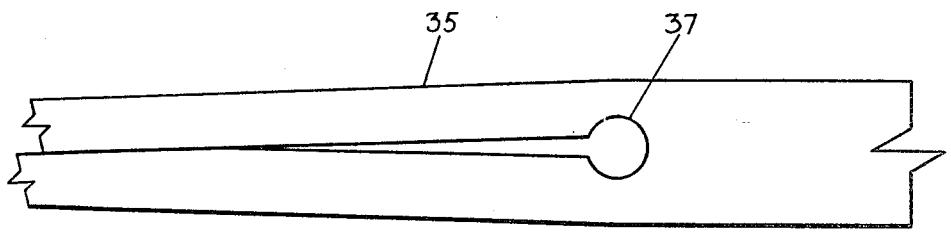
FIG. 6 is an enlarged partial view of the rotor blade spar 35.

The outboard taper is constructed as an integral part of the rotor blade with no discontinuity of structure. Referring to FIGS. 3, 5 and 6, the spar 35 located along the entire leading edge of the blade, is cut through along its fore and aft webs to that point at which it is desired to initiate the blade taper. A relief cut 37 is provided at that point. The upper and lower spar sections are reformed to the desired shape over a removable mandrel (tool) and then pressed together and bonded to provide the desired taper; and a doubler 31 is bonded to the aft web portions and the nose block 33 is bonded to the forward web portions to restore the structural integrity of the spar.

Portions of the nose block 33 and the core 39 adjacent to the outboard tapered part of the spar are made to conform thereto, whereupon those parts with the trailing edge 29, are bonded together as illustrated, and are covered by skins 17.

To provide the necessary chordwise stiffness in the inboard area the blade may be constructed as illustrated in FIG. 2. The trailing edge 29, conventionally long and narrow throughout the length of the blade, is provided with a significantly broadened (chordwise) inboard section upon assembly, a portion of which is then cut away after assembly to provide the inboard cutout but leaving a chordwise trailing edge section wide enough to provide the blade with the required chordwise strength and stiffness.

Figure 4:
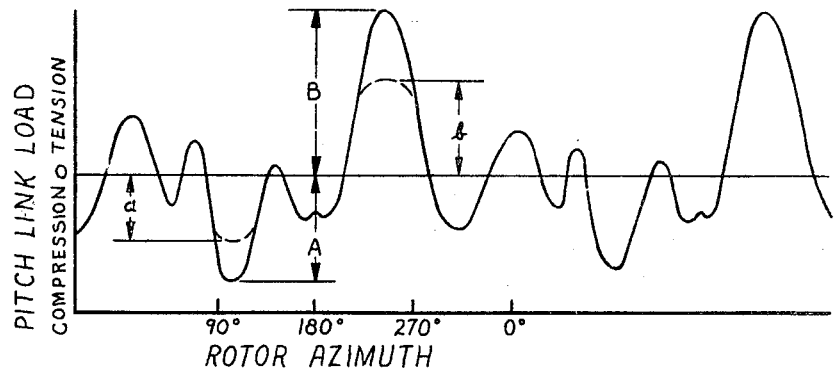
FIG. 4 is a graph illustrating the azimuthal variation in rotor control loads, and the effect thereon of the subject invention.

In FIG. 4 a typical variation of pitch link load with rotation is illustrated, the load A being the compression loading on the pitch link when the blade to which it is attached is "advancing." The load B is the load on the pitch link in tension when the blade is "retreating." Thus, with rotation of the rotor the pitch link load oscillates from an amount B in tension on the advancing side to A in compression on the retreating side. By constructing the blade in the manner herein taught, these peaks B and A are significantly lowered, as, for example, to $b$ and $a$ respectively, illustrated by the dash line in FIG. 4. As the magnitude of the oscillation of this force, and the highest absolute value of the compressive and tensile loads determine the life of the link and associated controls and the vibration level, and as the loads are directly related to the speed of the rotor and craft, it is clear that construction of the rotor blade according to this invention contributes materially to a higher speed of the aircraft.

It is to be understood that the invention is not limited to the specific embodiment herein illustrated and described, but may be used in other ways without departure from its spirit as defined by the following claim.

What is claimed is:

1. A method of providing thickness taper to the outboard section of a rotor blade that has a spar with a vertical web portion, comprising the steps of
   (a) severing the vertical web along a horizontal plane extending from one end of the spar to a predetermined location along the spar,
   (b) pressing the severed portions of the vertical web toward each other so that the spar is tapered in thickness from the predetermined location to the end of the spar, and
   (c) attaching a support member to the severed portions of the vertical web to provide structural integrity thereto.

No references cited.

EVERETTE A. POWELL, JR., *Primary Examiner.*